United States Patent
Fischer et al.

(10) Patent No.: US 12,092,818 B2
(45) Date of Patent: Sep. 17, 2024

(54) PROJECTION ASSEMBLY FOR A HEAD-UP DISPLAY (HUD) WITH P-POLARISED RADIATION

(71) Applicant: SAINT-GOBAIN GLASS FRANCE, Courbevoie (FR)

(72) Inventors: Klaus Fischer, Alsdorf (DE); Jan Hagen, Bonn (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 563 days.

(21) Appl. No.: 17/437,344

(22) PCT Filed: May 20, 2020

(86) PCT No.: PCT/EP2020/064022
§ 371 (c)(1),
(2) Date: Sep. 8, 2021

(87) PCT Pub. No.: WO2021/004685
PCT Pub. Date: Jan. 14, 2021

(65) Prior Publication Data
US 2022/0179208 A1    Jun. 9, 2022

(30) Foreign Application Priority Data

Jul. 5, 2019    (EP) .................................... 19184617

(51) Int. Cl.
*G02B 27/01*    (2006.01)
*B32B 17/10*    (2006.01)
(Continued)

(52) U.S. Cl.
CPC .... *G02B 27/0101* (2013.01); *B32B 17/10036* (2013.01); *B32B 17/10229* (2013.01);
(Continued)

(58) Field of Classification Search
CPC .. G02B 5/0284; G02B 5/0875; G02B 5/3041; G02B 5/3066; G02B 27/0018;
(Continued)

(56) References Cited

U.S. PATENT DOCUMENTS 11,630,301 B2 *    4/2023    Wagner ............. B32B 17/10229
                                                        359/630
2009/0153962 A1    6/2009    Okada et al.
(Continued)

FOREIGN PATENT DOCUMENTS

DE    10 2014 220189 A1    4/2016
DE    3 187 917 A2    7/2017
(Continued)

OTHER PUBLICATIONS

International Search Report as issued in International Patent Application No. PCT/EP2020/064022, dated Aug. 25, 2020.

*Primary Examiner* — Sultan Chowdhury
(74) *Attorney, Agent, or Firm* — Pillsbury Winthrop Shaw Pittman LLP

(57) ABSTRACT

A projection assembly for a head-up display (HUD) includes a windshield, including an outer and inner pane joined to one another via a thermoplastic intermediate layer, and having an HUD region; and a projector directed at the HUD region. The radiation of the projector is predominantly p-polarised, and the windshield is provided with a reflective coating, which is suitable for reflecting p-polarised radiation. The reflective coating has exactly one electrically conductive layer and arranged one above and one below the electrically conductive layer are two dielectric layer sequences, each including n low-optical-refraction layers having an index of refraction less than 1.8 and (n+1) high-optical-refraction (Continued)

Figure 1:
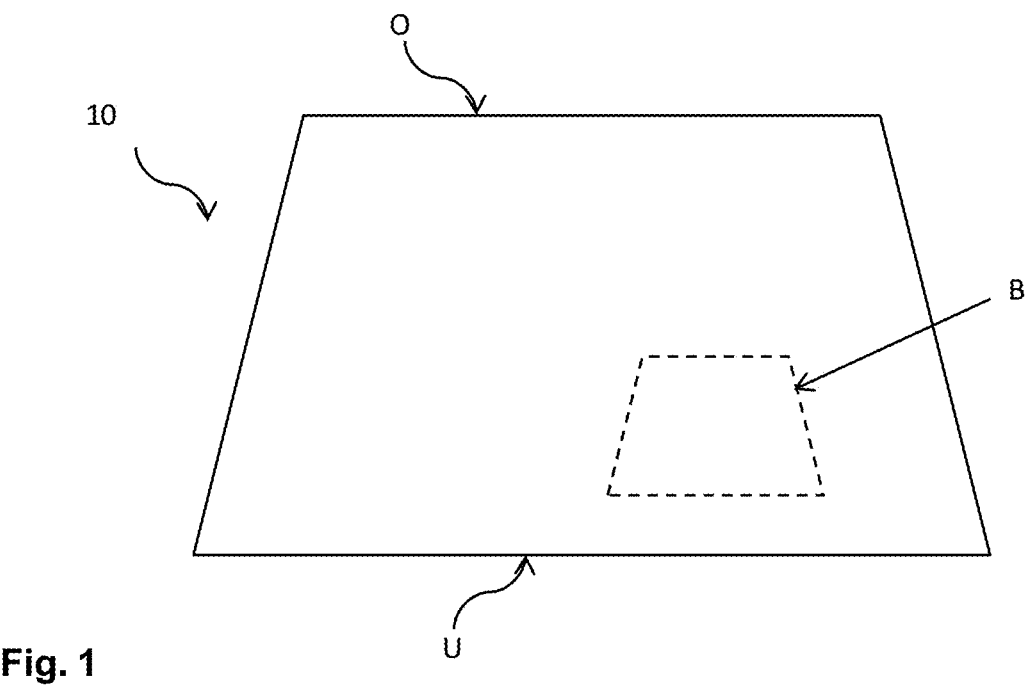

layers having an index of refraction greater than 1.8, arranged alternatingly in each case, wherein n is an integer greater than or equal to 1.

20 Claims, 3 Drawing Sheets

(51) Int. Cl.
    *B32B 27/30*     (2006.01)
    *B60J 3/00*     (2006.01)
    *B60K 35/00*     (2006.01)
    *C03C 17/36*     (2006.01)
    *G02B 5/30*     (2006.01)
    *B60K 35/23*     (2024.01)

(52) U.S. Cl.
    CPC .. *B32B 17/10458* (2013.01); *B32B 17/10761* (2013.01); *B32B 27/30* (2013.01); *B60J 3/007* (2013.01); *B60K 35/00* (2013.01); *C03C 17/3618* (2013.01); *C03C 17/3626* (2013.01); *C03C 17/3644* (2013.01); *C03C 17/366* (2013.01); *C03C 17/3681* (2013.01); *G02B 5/3041* (2013.01); *B32B 2250/40* (2013.01); *B32B 2255/205* (2013.01); *B32B 2255/28* (2013.01); *B32B 2307/202* (2013.01); *B32B 2307/204* (2013.01); *B32B 2307/412* (2013.01); *B32B 2307/42* (2013.01); *B32B 2315/08* (2013.01); *B32B 2329/06* (2013.01); *B32B 2551/00* (2013.01); *B32B 2605/006* (2013.01); *B32B 2605/08* (2013.01); *B60K 35/23* (2024.01); *C03C 2217/734* (2013.01)

(58) Field of Classification Search
CPC .............. G02B 27/01; G02B 27/0101; G02B 27/0172; B32B 17/1022; B32B 17/1077; B32B 17/10005; B32B 17/10036; B32B 17/10165; B32B 17/10174; B32B 17/10229; B32B 17/10458; B32B 17/10568; B32B 17/10761; C03C 17/36; C03C 17/366; C03C 17/3435; C03C 17/3618; C03C 17/3626; C03C 17/3636; C03C 17/3644; C03C 17/3681; B60J 3/00; B60J 3/002; B60J 3/005; B60J 3/007; B60J 3/06
See application file for complete search history.

(56) References Cited

U.S. PATENT DOCUMENTS

| | | |
|---|---|---|
| 2014/0340759 A1 | 11/2014 | Yano |
| 2017/0242247 A1 | 8/2017 | Tso et al. |
| 2017/0361687 A1 | 12/2017 | Chen et al. |
| 2019/0329529 A1* | 10/2019 | Schulz .............. B32B 17/10568 |
| 2020/0073121 A1* | 3/2020 | Banyay ................... G09G 5/36 |

FOREIGN PATENT DOCUMENTS

| | | |
|---|---|---|
| DE | 20 2019 102388 U1 | 5/2019 |
| EP | 1 880 243 A2 | 1/2008 |
| EP | 1 800 855 B1 | 2/2013 |
| WO | WO 2006/122305 A2 | 11/2006 |
| WO | WO 2009/071135 A1 | 6/2009 |
| WO | WO 2017/198363 A1 | 11/2017 |
| WO | WO 2019/046157 A1 | 3/2019 |

* cited by examiner

PROJECTION ASSEMBLY FOR A HEAD-UP DISPLAY (HUD) WITH P-POLARISED RADIATION

CROSS-REFERENCE TO RELATED APPLICATIONS

This application is the U.S. National Stage of PCT/EP2020/064022, filed May 20, 2020, which in turn claims priority to European patent application number 19184617.9 filed Jul. 5, 2019. The content of these applications are incorporated herein by reference in their entireties.

The invention relates to a projection assembly for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his point of view). Thus, important data can be projected into the driver's field of vision, for example, the current driving speed, navigation or warning messages, which the driver can perceive without having to divert his glance from the road. Head-up displays can thus contribute significantly to an increase in traffic safety.

HUD projectors are predominantly operated with s-polarised radiation and irradiate the windshield with an angle of incidence of about 65%, which is near Brewster's angle for an air/glass transition (57.2° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection assemblies that work with windshields without wedge films. For example, it is possible to operate the HUD projector with p-polarised radiation, which is not significantly reflected by the pane surfaces. Instead, the windshield has a reflective coating as a reflection surface for the p-polarised radiation. DE102014220189A1 discloses such an HUD projection assembly that is operated with p-polarised radiation. Proposed, among other things, as a reflecting structure is a single metallic layer with a thickness of 5 nm to 9 nm, made, for example, of silver or aluminium. WO2019046157A1 also discloses an HUD with p-polarised radiation, wherein a reflective coating with at least two metallic layers is used. Another HUD with p-polarised radiation and reflective coating is known from US2017242247A1.

US2014340759A1 discloses a combiner of a head-mounted display that is equipped with a reflective coating. The reflective coating has dielectric layer sequences above and below an electrically conductive layer. In embodiments, the dielectric layer sequences are formed from n high-optical-refraction layers and (n+1) low-optical-refraction layers that are arranged alternatingly.

US2009153962A1 discloses an HUD with p-polarised radiation and a coating comprising two polarisation-converting layers and an interposed layer with a refractive index that differs from the refractive index of the polarisation-converting layers. In one embodiment, the interposed layer can be an electrically conductive layer made of indium tin oxide. The polarisation-converting layers are implemented as stretched polymeric films.

EP3187917A2 discloses an HUD with p-polarised radiation and a reflective coating that comprises at least one metallic layer between dielectric layers. Materials for the dielectric layers are $ZnSnMgO_x$, $ZnSnO_x$, $ZnO$, $SnO_2$, $TiO_2$, $Si_3N_4$, and AlN. These are high-optical-refraction materials with a refractive index greater than 1.8.

DE202019102388U1 discloses a windshield with an electrically conductive coating. The windshield is equipped with a camera and and is provided, in the region of the camera, with a dielectric superlattice that acts as a kind of bandstop filter in front of the camera to mitigate the negative effects of the electrically conductive coating on the functionality of the camera. The superlattice is formed from alternatingly arranged dielectric layers with different refractive indices and and has no electrically conductive layers.

WO2017198363A1 discloses an HUD with s-polarised radiation and an electrically conductive coating. The electrically conductive coating comprises at least one electrically conductive layer and dielectric layers, for which the customary high-optical-refraction materials with a refractive index greater than 1.8 are proposed.

US2017361687A1 discloses a thermoplastic intermediate layer for a composite pane that can be used for an HUD. The intermediate layer comprises two polymeric layers made of polyvinyl acetal and one interposed polarisation-converting polymeric layer.

There is a need for projection assemblies for HUDs having reflective coatings that ensure high transmittance in the visible spectral range as well as high reflectivity relative to p-polarised radiation and allow color-neutral display. The object of the present invention is to provide such an improved projection assembly.

The object of the present invention is accomplished according to the invention by a projection assembly in accordance with claim 1. Preferred embodiments are disclosed in the dependent claims.

According to the invention, p-polarised radiation is used for generating the HUD image, and the composite pane has a reflective coating that sufficiently reflects p-polarised radiation. Since the angle of incidence of about 65° typical for HUD projection assemblies is relatively close to Brewster's angle for an air/glass transition (57.2°, soda lime glass), the p-polarised radiation is hardly reflected by the pane surfaces, but instead primarily by the conductive coating. Consequently, ghost images do not occur or are hardly perceptible such that the use of an expensive wedge film can be dispensed with. In addition, the HUD image is recognizable even for wearers of polarisation-selective sunglasses, which typically allow only p-polarised radiation to pass through and block s-polarised radiation. The reflective coating according to the invention causes high reflectivity relative to p-polarised radiation in the spectral range from 450 nm to 650 nm, which is relevant for HUD displays (HUD projectors typically operate at wavelengths of 473 nm, 550 nm, and 630 nm (RGB)). This results in a high-intensity HUD image. The single electrically conductive layer of the reflective coating smooths the reflective spectrum in the relevant spectral range such that a colour-neutral display is ensured. At the same time, the single conductive layer does not excessively reduce transmittance such that the pane can still be used as a windshield. These are major advantages of the present invention.

The projection assembly according to the invention for a head-up display (HUD) includes at least a windshield provided with a reflective coating and a projector (HUD projector). As is usual with HUDs, the projector irradiates a region of the windshield where the radiation is reflected in the direction of the viewer (driver), generating a virtual image, which the viewer perceives, from his point of view, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eye box window". This eye box window can be shifted vertically by adjustment of the mirrors, with the entire area thus available (i.e., the superimposing of all possible eye box windows) referred to as the "eye box". A viewer situated within the eye box can perceive the virtual image. This, of course, means that the eyes of the viewer must be situated within the eye box, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The windshield comprises an outer pane and an inner pane that are joined to one another via a thermoplastic intermediate layer. The windshield is intended, in a window opening, in particular the window opening of a vehicle, to separate the interior from the outside environment. In the context of the invention, the term "inner pane" refers to the pane of the windshield facing the vehicle interior. The term "outer pane" refers to the pane facing the outside environment. The windshield is preferably the windshield of a motor vehicle, in particular of a passenger car or a truck).

The windshield has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the outside environment. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The projector is directed at the HUD region of the windshield. It irradiates the HUD region with radiation in the visible range of the electromagnetic spectrum to generate the HUD projection, in particular in the spectral range from 450 nm to 650 nm, for example, with the wavelengths of 473 nm, 550 nm, and 630 nm (RGB). The radiation of the projector is predominantly p-polarised. The reflective coating is suitable for reflecting p-polarised radiation. As a result, a virtual image which the driver of the vehicle can perceive as behind the windshield from his point of view is generated from the projector radiation.

The reflective coating according to the invention has exactly one electrically conductive layer. One dielectric layer sequence is in each case arranged below and above the electrically conductive layer. The two dielectric layer sequences include n low-optical-refraction layers with a refractive index less than 1.8 and (n+1) high-optical-refraction layers with a refractive index greater than 1.8, which are in each case arranged alternatingly. n is an integer greater than or equal to 1.

From bottom to top within the dielectric layer sequence, there is first a high-optical-refraction layer, then a low-optical-refraction layer, and then a high-optical-refraction layer. When n>1, further low-optical-refraction and high-optical-refraction layers follow accordingly. In a preferred embodiment, the reflective coating comprises only the electrically conductive layer, the n low-optical-refraction dielectric layers, and the (n+1) high-optical-refraction dielectric layers. The low-optical-refraction layers are then in direct contact with the adjacent high-optical-refraction layers. The electrically conductive layer is in direct contact with the uppermost high-optical-refraction layer of the lower dielectric layer sequence and with the lowest high-optical-refraction layer of the upper dielectric layer sequence.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer. The values indicated for refractive indices are measured at a wavelength of 550 nm.

The reflective coating is preferably applied to one of the surfaces of the two panes facing the intermediate layer, i.e., the interior-side surface of the outer pane or the exterior-side surface of the inner pane. Alternatively, the reflective coating can also be arranged within the thermoplastic intermediate layer, for example, applied to a carrier film that is arranged between two thermoplastic bonding films. The reflective coating is transparent, meaning, in the context of the invention, that it has average transmittance in the visible spectral range of at least 70%, preferably at least 80% and thus does not substantially restrict vision through the pane. In principle, it is sufficient for the HUD region of the windshield to be provided with the reflective coating. However, other regions can also be provided with the reflective coating and the windshield can be provided with the reflective coating essentially over its entire surface, which may be preferred for manufacturing reasons. In one embodiment of the invention, at least 80% of the pane surface is provided with the reflective coating according to the invention. In particular, the reflective coating is applied to the pane surface over its entire surface with the exception of a peripheral edge region and, optionally, a local region intended to ensure the transmittance of electromagnetic radiation through the windshield as communication windows, sensor windows, or camera windows, and, consequently, are not provided with the reflective coating. The peripheral uncoated edge region has, for example, a width of up to 20 cm. It prevents direct contact of the reflective coating with the surrounding atmosphere such that the reflective coating is protected, inside the windshield, against corrosion and damage.

The reflective coating according to the invention has IR-reflecting properties due to the electrically conductive layer such that it functions as a sun protection coating that reduces the heating of the vehicle interior by reflecting thermal radiation. The reflective coating can also be used as a heating coating when it is electrically contacted such that a current flows through it, heating the reflective coating.

In the spectral range from 450 nm to 650 nm, which is of particular interest for the display of HUD projectors, the windshield provided with the reflective coating preferably has an averaged reflectance relative to p-polarised radiation of at least 10%, particularly preferably of at least 15%, most particularly preferably of at least 20%. This produces a sufficiently high intensity projection image. The reflectance is measured with an angle of incidence of 65° relative to the interior-side surface normal, which corresponds approx. to the irradiation from conventional projectors. The high reflectance along with a relatively simple layer structure is a major advantage of the present invention. Particularly good results are achieved when the reflectance in the entire spectral range from 450 nm to 650 nm is at least 10%, preferably at least 15%, particularly preferably 20% such that the reflectance in the specified spectral range is not below the specified values at any point.

Reflectance describes the proportion of the total incident radiation that is reflected. It is indicated in % (based on 100% incident radiation) or as a unitless number from 0 to 1 (normalized to the incident radiation). Plotted as a function of the wavelength, it forms the reflection spectrum. In the context of the present invention, the statements concerning reflectance relative to p-polarised radiation are based on the reflectance measured with an angle of incidence of 65° relative to the interior-side surface normal. The data regarding the reflectance or the reflection spectrum are based on a reflection measurement with a light source that emits uniformly with a normalized radiation intensity of 100% in the spectral range under consideration.

In order to achieve the most color-neutral display of the projector image possible, the reflection spectrum should be as smooth as possible and should have no pronounced local minima and maxima. In the spectral range from 450 nm to 650 nm, the difference between the maximally occurring reflectance and the mean of the reflectance as well as the difference between the minimally occurring reflectance and the mean of the reflectance in a preferred embodiment should be at most 5%, particularly preferably at most 3%. Here again, the reflectance relative to p-polarised radiation is measured with an angle of incidence of 65° relative to the interior-side surface normal. The resultant difference is to be considered as the absolute deviation of reflectance (reported in %), not as a percentage deviation relative to the mean. The specified smoothness of the reflection spectrum can easily be achieved with the reflective coating according to the invention due to its electrically conductive layer. The electrically conductive layer yields a smoothing of the spectrum.

The above-mentioned desired reflection characteristics are achieved in particular through the choice of the materials and thicknesses of the individual layers as well as the structure of the dielectric layer sequence. The reflective coating can thus be suitably adjusted.

The reflective coating is a thin-film stack, i.e., a layer sequence of thin individual layers. This thin-film stack contains exactly one electrically conductive layer. The reflective coating thus contains no more than one electrically conductive layer, and no further electrically conductive layers are arranged above or below the reflective coating. It is a particular advantage of the present invention that the desired reflection properties can be achieved with a single conductive layer without excessively reducing the transmittance, as would be the case if multiple conductive layers were used.

The electrically conductive layer is in particular a metal-containing layer. The electrically conductive layer is preferably based on silver. The conductive layer preferably contains at least 90 wt.-% silver, particularly preferably at least 99 wt.-% silver, most particularly preferably at least 99.9 wt.-% silver. Alternatively, however, other electrically conductive materials can also be provided, for example, gold, copper, or aluminium or transparent conductive oxides (TCOs) such as indium tin oxide (ITO). The layer thickness of the conductive layer is preferably at most 15 nm, particularly preferably at most 14 nm, most particularly preferably at most 13 nm. As a result, the desired smoothing effect with regard to the reflection spectrum can be achieved as well as advantageous reflectivity in the IR range, without excessively reducing transmittance. The layer thickness of the conductive layer is preferably at least 5 nm, particularly preferably at least 8 nm. Thinner silver layers can lead to dewetting of the layer structure. Particularly preferably, the layer thickness of the conductive layers is from 8 nm to 14 nm or from 8 nm to 13 nm.

In the context of the present invention, thickness or layer thickness refers to the geometric thickness, not the optical thickness, which is the product of the refractive index and the geometric thickness.

When a layer is based on a material, the layer consists for the most part of this material, in particular substantially of this material in addition to any impurities or dopants.

The electrically conductive layer is arranged in the center of the reflective coating, which is constructed symmetrically around the electrically conductive layer. Thus, the desired reflection characteristic is achieved. Arranged one above and one below the electrically conductive layer is, in each case, one dielectric layer sequence comprising n low-optical-refraction layers with a refractive index less than 1.8 and (n+1) high-optical-refraction layers with a refractive index greater than 1.8. The high- and low-optical-refraction layers are, in each case, arranged alternatingly, where n is an integer greater than or equal to 1. Each dielectric layer sequence thus has at least the following structure and preferably consists of only the layers indicated (from the bottom upward starting from the substrate):

high-optical-refraction layer (index of refraction greater than 1.8)
low-optical-refraction layer (index of refraction less than 1.8)
high-optical-refraction layer (index of refraction greater than 1.8)

In a preferred embodiment, the number n of dielectric layer sequences is 1. This simplest possible structure of the coating according to the invention is preferred for manufacturing reasons and for cost reasons, and the desired reflection characteristics can be realized therewith. The reflective coating then has the following layer structure and preferably consists of only the layers indicated (starting from the substrate on which the coating is applied):

a first high-optical-refraction layer
a first low-optical-refraction layer
a second high-optical-refraction layer
the electrically conductive layer
a third high-optical-refraction layer
a second low-optical-refraction layer
a fourth high-optical-refraction layer The high- and low-optical-refraction layers are dielectric layers. Due to their alternating structure, the reflection behaviour can be specifically adjusted as a result of interference effects, in particular through the choice of materials and layer thicknesses. Thus, it is possible to realize a reflective coating with effective reflection relative to p-polarised radiation in the visible spectral range. In addition, the quality of the material of the electrically conductive layer (for example, the purity of the metal) also has an influence on the reflection characteristics.

The high-optical-refraction layers are preferably based on silicon nitride, tin zinc oxide, silicon zirconium nitride, zirconium oxide, niobium oxide, hafnium oxide, tantalum oxide, tungsten oxide, titanium oxide, silicon carbide, or diamond-like carbon (DLC), particularly preferably based on silicon nitride. The low-optical-refraction layers are preferably based on silicon oxide, aluminium oxide, magnesium fluorite, silicon oxynitride, or calcium fluorite, particularly preferably based on silicon oxide. Good results are achieved therewith. The oxides and nitrides mentioned can be deposited stoichiometrically, substoichiometrically, or superstoichiometrically. They can have dopants.

It has been shown that particularly good results are obtained when the lowest low-optical-refraction layer is relatively thin with a layer thickness of at most 50 nm, preferably at most 30 nm. The remaining dielectric layers preferably have a thickness of 150 nm to 400 nm. The number n of the dielectric layer sequences is preferably 1.

The reflective coating with the reflection characteristics according to the invention can, in principle, be realized in various ways, preferably using the above-described layers such that the invention is not restricted to a specific layer sequence. In the following, a particularly preferred embodiment of the coating is presented, with which particularly good results are achieved, in particular with a typical angle of incidence of the radiation of about 65°. The number n of the dielectric layer sequence is 1, and the reflective coating then has the following layer structure (starting from the substrate on which the coating is applied):

a first high-optical-refraction layer based on silicon nitride, tin zinc oxide, silicon zirconium nitride, or titanium oxide, in particular silicon nitride, with a thickness from 235 nm to 355 nm, preferably from 270 nm to 320 nm, in particular from 295 nm to 300 nm (for example, about 298 nm);

a first low-optical-refraction layer based on silicon oxide with a thickness from 15 nm to 30 nm, preferably from 20 to 25 nm (for example, about 22 nm);

a second high-optical-refraction layer based on silicon nitride, tin zinc oxide, silicon zirconium nitride, or titanium oxide, in particular silicon nitride, with a thickness from 165 nm to 245 nm, preferably from 185 nm to 225 nm, in particular from 205 nm to 210 nm (for example, about 206 nm);

the electrically conductive layer, preferably based on silver and preferably with a thickness from 5 nm to 15 nm, in particular from 8 nm to 13 nm;

a third high-optical-refraction layer based on silicon nitride, tin zinc oxide, silicon zirconium nitride, or titanium oxide, in particular silicon nitride, with a thickness from 155 nm to 235 nm, preferably from 175 nm to 215 nm, in particular from 195 nm to 200 nm (for example, about 196 nm);

a second low-optical-refraction layer based on silicon oxide with a thickness from 170 nm to 255 nm, preferably from 190 to 235 nm, in particular from 210 nm to 215 nm (for example, about 214 nm);

a fourth high-optical-refraction layer based on silicon nitride, tin zinc oxide, silicon zirconium nitride, or titanium oxide, in particular silicon nitride, with a thickness from 210 nm to 315 nm, preferably from 235 nm to 290 nm, in particular from 260 nm to 265 nm (for example, about 262 nm).

The reflective coating preferably consists of the layers indicated and has no other layers.

The projector is arranged on the interior-side of the windshield and irradiates the windshield via the interior-side surface of the inner pane. It is directed toward the HUD region and irradiates it to generate the HUD projection. According to the invention, the radiation of the projector is predominantly p-polarised, thus has a p-polarised radiation component greater than 50%. The higher the proportion of the p-polarised radiation in the total radiation of the projector, the higher the intensity of the desired projection image and the lower the intensity of the undesired reflections on the surfaces of the windshield. The p-polarised radiation component of the projector is preferably at least 70%, particularly preferably at least 80%, and in particular at least 90%. In a particularly advantageous embodiment, the radiation of the projector is essentially purely p-polarised—the p-polarised radiation component is thus 100% or deviates only insignificantly therefrom. The indication of the polarisation direction is based on the plane of incidence of the radiation on the windshield. The expression "p-polarised radiation" refers to radiation whose electric field oscillates in the plane of incidence. "S-polarised radiation" refers to radiation whose electric field oscillates perpendicular to the plane of incidence. The plane of incidence is generated by the vector of incidence and the surface normal of the windshield in the geometric centre of the irradiated region.

The polarisation, i.e., in particular the proportion of p- and s-polarised radiation, is determined at one point of the HUD region, preferably in the geometric centre of the HUD region. Since windshields are usually curved, thus affecting the plane of incidence of the projector radiation, slightly deviating polarisation proportions can occur in the remaining regions, which is unavoidable for physical reasons.

The radiation of the projector preferably strikes the windshield with an angle of incidence from 45° to 70°, in particular from 60° to 70°. In an advantageous embodiment, the angle of incidence deviates from Brewster's angle by at most 10°. The p-polarised radiation is then reflected only insignificantly on the surface of the windshield such that no ghost image is generated. The angle of incidence is the angle between the vector of incidence of the projector radiation and the interior-side surface normal (i.e., the surface normal on the interior-side external surface of the windshield) in the geometric centre of the HUD region. Brewster's angle for an air-glass transition in the case of soda lime glass, which is commonly used for window panes, is 57.2°. Ideally, the angle of incidence should be as close as possible to this Brewster's angle. However, angles of incidence of 65°, which are common for HUD projection assemblies, are easily implemented in vehicles, and deviate only slightly from Brewster's angle can, for example, also be used such that the reflection of the p-polarised radiation increases only insignificantly.

Since the reflection of the projector radiation occurs substantially at the reflective coating aid not at the external pane surfaces, it is not necessary to arrange the external pane surfaces at an angle relative to one another in order to avoid ghost images. The external surfaces of the windshield are, consequently, preferably arranged substantially parallel to one another. The thermoplastic intermediate layer is preferably not implemented wedge-like, but, instead, has a substantially constant thickness, in particular even in the vertical course between the upper edge and the lower edge of the windshield, just like the inner pane and the outer pane. A wedge-like intermediate layer would, in contrast, have a variable thickness, in particular an increasing thickness, in the vertical course between the lower edge and the upper edge of the windshield. The intermediate layer is typically formed from at least one thermoplastic film. Since standard films are significantly more economical than wedge films, the production of the windshield is significantly more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colourless, but also tinted or coloured. In a preferred embodiment, the total transmittance through the windshield (including the reflective coating) is greater than 70%. The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

The windshield is preferably curved in one or a plurality of spatial directions, as is customary for motor vehicle window panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The windshield is can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflective coating is preferably applied by physical vapour deposition (PVD) onto a pane surface, particularly preferably by cathodic sputtering ("sputtering"), most particularly preferably by magnetron-enhanced cathodic sputtering. The coating is preferably applied before lamination. Instead of applying the reflective coating on a pane surface, it can, in principle, also be provided on a carrier film that is arranged in the intermediate layer.

If the windshield is to be curved, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflective coating.

The invention also includes the use of a windshield implemented according to the invention as a projection surface of a projection assembly for a head-up display, wherein a projector whose radiation is predominantly p-polarised is directed toward the HUD region. The above-described preferred embodiments apply mutatis mutandis to the use.

The invention further includes the use of a projection assembly according to the invention as an HUD in a motor vehicle, in particular in a passenger car or a truck.

In the following, the invention is explained in detail with reference to drawings and exemplary embodiments. The drawings are schematic representations and are not true to scale. The drawings in no way restrict the invention.

Figure 2:
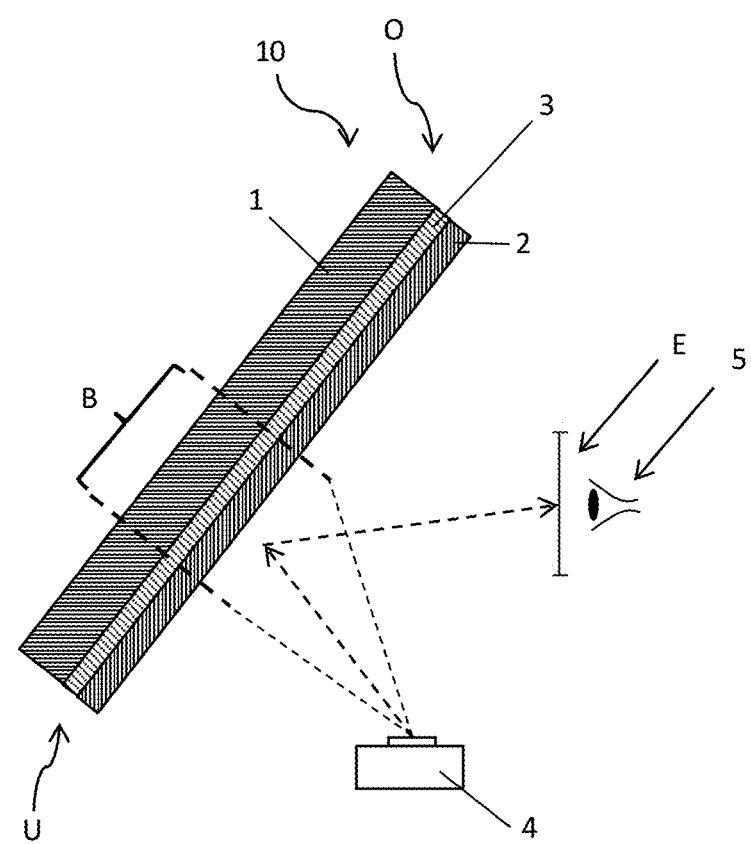
Figure 3:
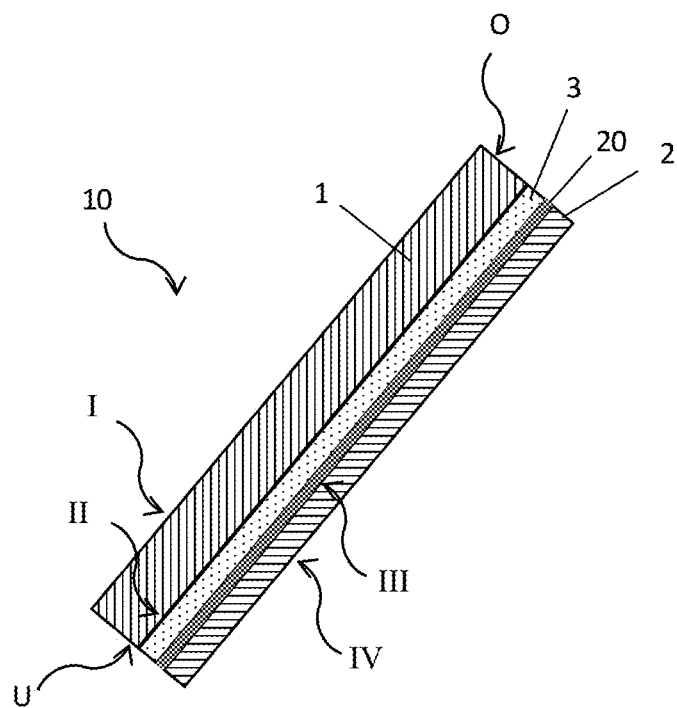
Figure 4:
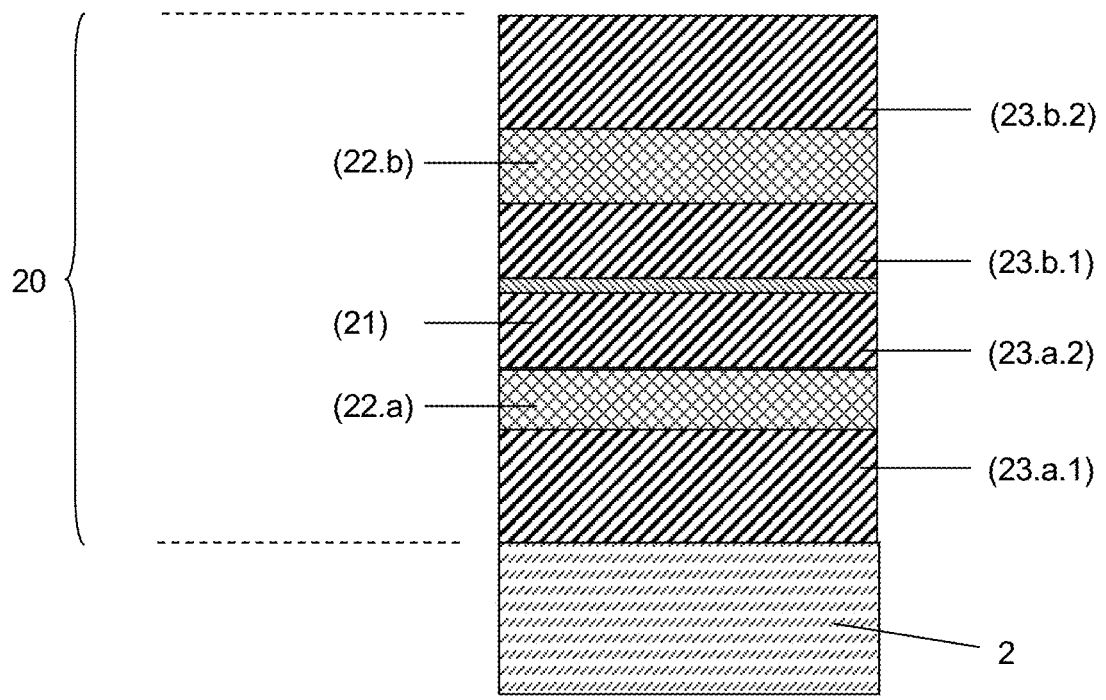
Figure 5:
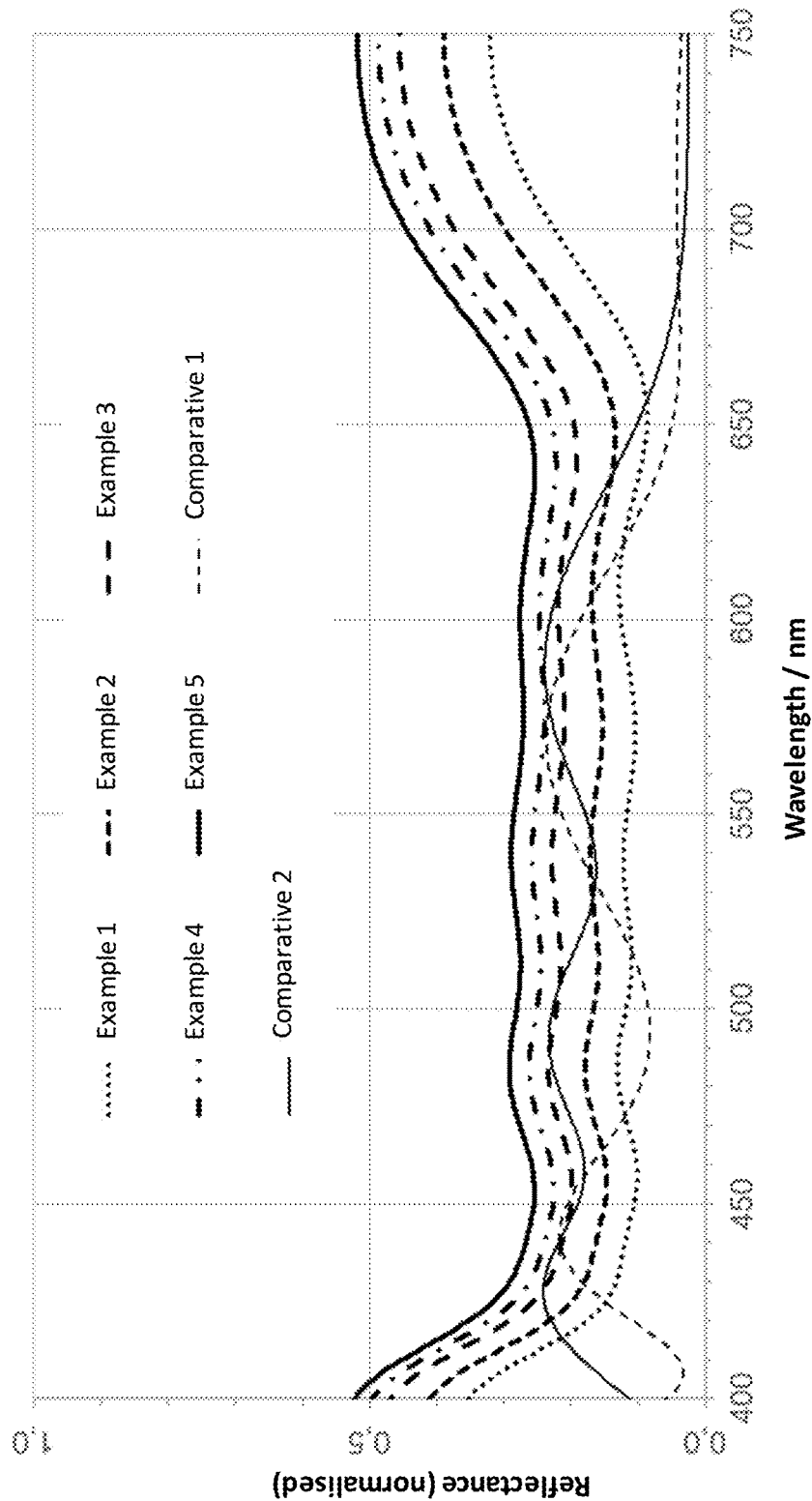

They depict:

FIG. 1 a plan view of a composite pane of a generic projection assembly,

FIG. 2 a cross-section through a generic projection assembly,

FIG. 3 a cross-section through a composite pane of a projection assembly according to the invention, FIG. 4 a cross-section through an embodiment of the reflective coating on an inner pane according to the invention, and FIG. 5 reflection spectra of composite panes relative to p-polarised radiation in accordance with five examples according to the invention and two comparative examples.

FIG. 1 and FIG. 2 each depict a detail of a generic projection assembly for an HUD. The projection assembly comprises a windshield 10, in particular the windshield of a passenger car. The projection assembly also comprises a projector 4 that is directed at a region of the composite pane 10. In this region, usually referred to as HUD region B, the projector 4 can generate images that are perceived by a viewer 5 (vehicle driver) as virtual images on the side of the composite pane 10 facing away from him if his eyes are situated within the so-called eye box E.

The windshield 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the outside environment; the inner pane 2, the vehicle interior.

FIG. 3 depicts an embodiment of a windshield 10 implemented according to the invention. The outer pane 1 has an exterior-side surface I that faces the outside environment in the installed position and an interior-side surface II that faces the interior in the installed position. Likewise, the inner pane 2 has an exterior-side surface III that faces the outside environment in the installed position and an interior-side surface IV that faces the interior in the installed position. The outer pane 1 and the inner pane 2 are made, for example, of soda lime glass. The outer pane 1 has, for example, a thickness of 2.1 mm; the inner pane 2, a thickness of 1.6 mm. The intermediate layer 3 is made, for example, of a PVB film with a thickness of 0.76 mm. The PVB film has an essentially constant thickness, apart from any surface roughness common in the art—it is not implemented as a so-called "wedge film".

The exterior-side surface III of the inner pane 2 is provided with a reflective coating 20 according to the invention, which is provided as a reflection surface for the projector radiation (and, possibly, additionally, as an IR reflective coating).

According to the invention, the radiation of the projector 4 is p-polarised, in particular essentially purely p-polarised. Since the projector 4 irradiates the windshield 10 at an angle of incidence of about 65°, which is close to Brewster's angle, the radiation of the projector is only insignificantly reflected at the external surfaces I, IV of the composite pane 10. In contrast, the reflective coating 20 according to the invention is optimized for reflection of p-polarised radiation. It serves as a reflection surface for the radiation of the projector 4 to generate the HUD projection.

FIG. 4 depicts the layer sequence of an advantageous embodiment of the reflective coating 20 according to the invention. The reflective coating 20 is a stack of thin layers, consisting of one electrically conductive layer 21, a total of four dielectric, high-optical-refraction layers 23 (23.a.1, 23.a.2, 23.b.1, 23.b.2), and a total of two low-optical-refraction layers 22 (22.a, 22.b). The electrically conductive layer 21 is arranged centrally in the thin-layer stack. Below the electrically conductive layer 21, two high-optical-refraction layers 23.a.1, 23.a.2 and one low-optical-refraction layer 22.a are deposited alternatingly on the substrate (inner pane 2). Also, above the electrically conductive layer 21, two high-optical-refraction layers 23.b.1, 23.b.2 and one low-optical-refraction layer 22.b are deposited alternatingly. The high-optical-refraction layers 23.a.1, 23.a.2, 23.b.1, 23.b.2 are based on silicon nitride (SiN); the low-optical-refraction layers 22.a, 22.b, based on silicon oxide (SiO); and the electrically conductive layer 21, based on silver (Ag).

The order of the layers can be seen schematically in the figure. The layer sequences of a windshield 10 with the reflective coating 20 on the exterior-side surface III of the inner pane 2 according to Examples 1 through 5 are also presented in Table 1, together with the materials and layer thicknesses of the individual layers. Independently of one another, the SiN and SiO layers can be doped, for example, with boron or aluminium.

TABLE 1

| Material | Reference Characters | Example 1 | Example 2 | Example 3 | Example 4 | Example 5 |
|---|---|---|---|---|---|---|
| Soda lime glass | 1 | 2.1 mm | 2.1 mm | 2.1 mm | 2.1 mm | 2.1 mm |
| PVB | 3 | 0.76 mm | 0.76 mm | 0.76 mm | 0.76 mm | 0.76 mm |
| SiN | 20 23.b.2 | 262 nm | 262 nm | 262 nm | 262 nm | 262 nm |
| SiO | 22.b | 214 nm | 214 nm | 214 nm | 214 nm | 214 nm |
| SiN | 23.b.1 | 196 nm | 196 nm | 196 nm | 196 nm | 196 nm |
| Ag | 21 | 8 nm | 10 nm | 12 nm | 13 nm | 14 nm |
| SiN | 23.a.2 | 206 nm | 206 nm | 206 nm | 206 nm | 206 nm |
| SiO | 22.a | 22 nm | 22 nm | 22 nm | 22 nm | 22 nm |
| SiN | 23.a.1 | 298 nm | 298 nm | 298 nm | 298 nm | 298 nm |
| Soda lime glass | 2 | 1.6 mm | 1.6 mm | 1.6 mm | 1.6 mm | 1.6 mm |

FIG. 5 depicts reflection spectra of a composite pane 10 as in FIG. 3, in each case with a layer structure in accordance with the Examples 1 to 5 according to the invention per Table 1 and in accordance with two Comparative Examples (Comparative Example 1, Comparative Example 2) per Table 2. The comparative examples had as a reflective coating 20 purely dielectric layer structures composed of alternatingly arranged high-optical-refraction and low-optical-refraction layers. The same materials were used here as for the dielectric layers of the examples according to the invention and the layer thicknesses were also optimized to the best possible reflection properties relative to p-polarised radiation in the spectral range from 450 nm to 650 nm. The reflection spectra were recorded with a light source that emits p-polarised radiation of uniform intensity in the spectral range observed, when irradiated via the inner pane (the so-called interior-side reflection) at an angle of incidence of 65° relative to the interior-side surface normal. The reflection measurement is thus approximated to the situation in the projection assembly.

TABLE 2

| Material | Reference Characters | Comparative Example 1 | Comparative Example 2 |
|---|---|---|---|
| Soda lime glass | 1 | 2.1 mm | 2.1 mm |
| PVB | 3 | 0.76 mm | 0.76 mm |
| SiN | 20 | 171 nm | 69 nm |
| SiO | | 28 nm | 37 nm |
| SiN | | 86 nm | 146 nm |
| SiO | | 42 nm | 56 nm |
| SiN | | 77 nm | 97 nm |
| SiO | | 178 nm | 111 nm |
| SiN | | 46 nm | 73 nm |
| SiO | | 90 nm | 84 nm |
| SiN | | 176 nm | 36 nm |
| SiO | | 18 nm | 71 nm |
| SiN | | 81 nm | 215 nm |
| Soda lime glass | 2 | 1.6 mm | 1.6 mm |

The averaged reflectance relative to p-polarised radiation as well as the differences of the maximum and minimum values relative to the reflectance of Examples 1 to 5 are summarized in Table 3; the corresponding values for the Comparative Example 1 and 2, in Table 4. Table 3 also indicates the values for the light transmittance of the composite panes per ISO 9050.

TABLE 3

| | Example 1 | Example 2 | Example 3 | Example 4 | Example 5 |
|---|---|---|---|---|---|
| Averaged reflectance relative to p-polarised radiation, 450 nm–650 nm | 11.4% | 16.0% | 21.5% | 24.4% | 27.4% |
| Difference between the maximally occurring reflectance and the mean | 1.7% | 1.9% | 1.9% | 1.8% | 1.8% |
| Difference between the minimally occurring reflectance and the mean | 2.8% | 2.6% | 2.4% | 2.2% | 2.1% |
| Light transmittance $T_L$ | 82.3% | 78.4% | 73.6% | 71.0% | 68.3 |

TABLE 4

|  | Comparative Example 1 | Comparative Example 2 |
|---|---|---|
| Averaged reflectance relative to p-polarised radiation, 450 nm-650 nm | 15.0% | 19.6% |
| Difference between the maximally occurring reflectance and the mean | 8.7% | 4.3% |
| Difference between the minimally occurring reflectance and the mean | 10.0% | 9.4% |

Although relatively high averaged reflectance values can also be achieved with the purely dielectric structures of the Comparative Examples, the spectra in the relevant spectral range from 450 nm to 650 nm are subject to strong fluctuations, which can lead to undesirable colour shifts in the HUD image. In contrast, the electrically conductive layer 21 of the Examples according to the invention causes a significant smoothing of the reflection spectrum, resulting in a more colour-neutral reproduction of the projector image. Moreover, even higher reflectance values can be obtained, in particular with increasing thickness of the conductive layer 21.

LIST OF REFERENCE CHARACTERS

(10) windshield
(1) outer pane
(2) inner pane
(3) thermoplastic intermediate layer
(4) projector/HUD projector
(5) viewer/vehicle driver
(20) reflective coating
(21) electrically conductive layer
(22) low-optical-refraction layer
(22.a), (22.b) low-optical-refraction layers
(23) high-optical-refraction layer
(23.a.1), (23.a.2), (23.b.1), (23.b.2) high-optical-refraction layers
(O) upper edge of the windshield 10
(U) lower edge of the windshield 10
(B) HUD region of the windshield 10
(E) eye box
(I) exterior-side surface of the outer pane 1, facing away from the intermediate layer 3
(II) interior-side surface of the outer pane 1, facing the intermediate layer 3
(III) exterior-side surface of the inner pane 2, facing the intermediate layer 3
(IV) interior-side surface of the inner pane 2, facing away from the intermediate layer 3

The invention claimed is:

1. A projection assembly for a head-up display (HUD), comprising: a windshield, comprising an outer pane and an inner pane, which are joined to one another via a thermoplastic intermediate layer, and having an HUD region; and an HUD projector, which is directed at the HUD region; wherein a radiation of the HUD projector is predominantly p-polarised, and the windshield is provided with a reflective coating which is adapted to reflect p-polarised radiation; and wherein the reflective coating has exactly one electrically conductive layer, and arranged one above and one below the electrically conductive layer are two dielectric layer sequences, each comprising n low-optical-refraction layers having an index of refraction less than 1.8 and (n+1) high-optical-refraction layers having an index of refraction greater than 1.8, arranged alternatingly in each case, wherein n is an integer greater than or equal to 1.

2. The projection assembly according to claim 1, wherein the windshield with the reflective coating has, in the spectral range from 450 nm to 650 nm, an averaged reflectance relative to p-polarised radiation of at least 10%.

3. The projection assembly according to claim 2, wherein, in the spectral range from 450 nm to 650 nm, a difference between a maximally occurring reflectance and a mean of the reflectance as well as a difference between the minimally occurring reflectance and the mean of the reflectance relative to p-polarised radiation is at most 5%.

4. The projection assembly according to claim 1, wherein the radiation of the HUD projector is essentially purely p-polarised.

5. The projection assembly according to claim 1, wherein the radiation of the HUD projector strikes the windshield with an angle of incidence of 60° to 70°.

6. The projection assembly according to claim 1, wherein the electrically conductive layer is based on silver.

7. The projection assembly according to claim 1, wherein the electrically conductive layer has a thickness of at most 15 nm.

8. The projection assembly according to claim 1, wherein the low-optical-refraction layers are based on silicon oxide, aluminium oxide, magnesium fluorite, silicon oxynitride, or calcium fluorite.

9. The projection assembly according to claim 1, wherein the high-optical-refraction layers are based on silicon nitride, tin zinc oxide, silicon zirconium nitride, zirconium oxide, niobium oxide, hafnium oxide, tantalum oxide, tungsten oxide, titanium oxide, silicon carbide, or diamond-like carbon (DLC).

10. The projection assembly according to claim 1, wherein n is equal to 1.

11. The projection assembly according to claim 1, wherein the reflective coating comprises the following layers:
   a high-optical-refraction layer based on silicon nitride, tin zinc oxide, silicon zirconium nitride, or titanium oxide, with a thickness from 235 nm to 355 nm,
   above that, a low-optical-refraction layer based on silicon dioxide with a thickness from 15 nm to 30 nm,
   above that, a high-optical-refraction layer based on silicon nitride, tin zinc oxide, silicon zirconium nitride, or titanium oxide, with a thickness from 165 nm to 245 nm,
   above that, the electrically conductive layer,
   above that, a high-optical-refraction layer based on silicon nitride, tin zinc oxide, silicon zirconium nitride, or titanium oxide, with a thickness from 155 nm to 235 nm,
   above that, a low-optical-refraction layer based on silicon dioxide with a thickness from 170 nm to 255 nm,
   above that, a high-optical-refraction layer based on silicon nitride, tin zinc oxide, silicon zirconium nitride, or titanium oxide, with a thickness from 210 nm to 315 nm.

12. The projection assembly according to claim 11, wherein the electrically conductive layer is based on silver with a thickness from 5 nm to 15 nm.

13. The projection assembly according to claim 1, wherein external surfaces of the windshield facing away from the intermediate layer are arranged essentially parallel to one another.

14. The projection assembly according to claim 1, wherein the reflective coating is arranged on a surface of the outer pane or the inner pane facing the intermediate layer or within the intermediate layer.

15. A method comprising forming an HUD in a motor vehicle with the projection assembly according to claim 1.

16. The projection assembly according to claim 1, wherein the averaged reflectance relative to p-polarised radiation is of at least 20%.

17. The projection assembly according to claim 3, wherein, in the spectral range from 450 nm to 650 nm, the difference between the maximally occurring reflectance and the mean of the reflectance as well as the difference between the minimally occurring reflectance and the mean of the reflectance relative to p-polarised radiation is at most 3%.

18. The projection assembly according to claim 7, wherein the electrically conductive layer has a thickness of at most 5 nm.

19. The projection assembly according to claim 8, wherein the low-optical-refraction layers are based on silicon oxide.

20. The projection assembly according to claim 9, wherein the high-optical-refraction layers are based on silicon nitride.

\* \* \* \* \*